June 27, 1950 E. M. HUNT 2,512,650
FORMING MACHINE

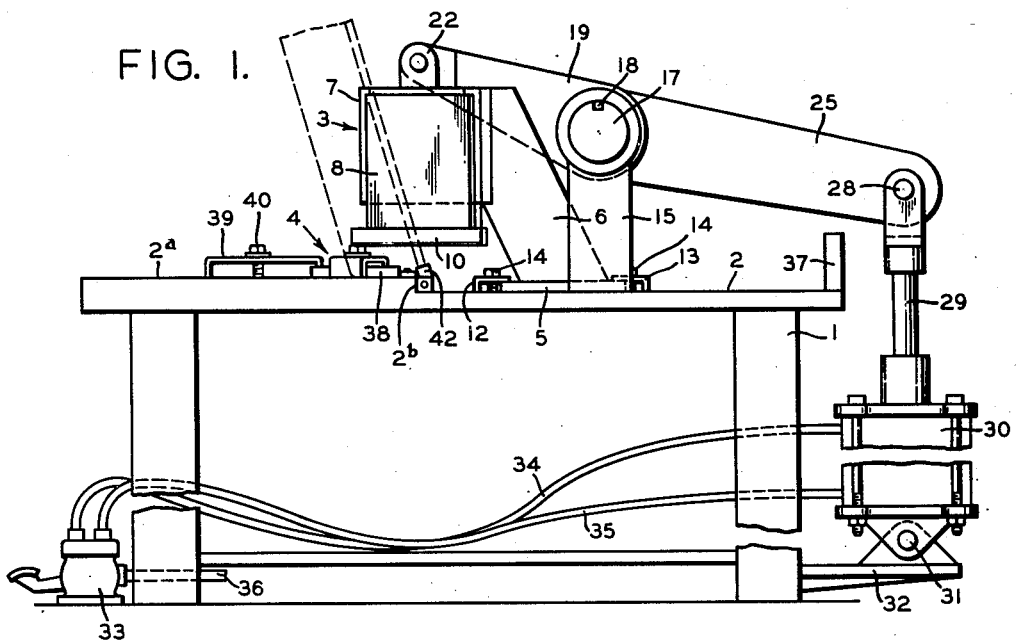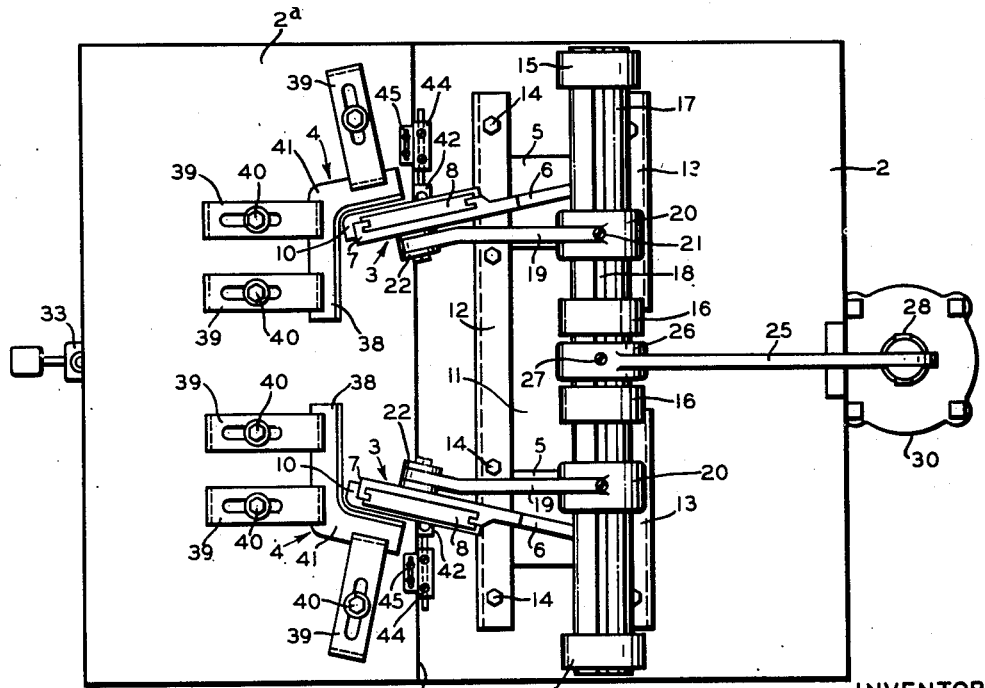

Filed Aug. 1, 1945 2 Sheets-Sheet 2

INVENTOR
EVERETT M. HUNT

BY Ralph L. Chappell
ATTORNEY

Patented June 27, 1950

2,512,650

UNITED STATES PATENT OFFICE 2,512,650

FORMING MACHINE

Everett M. Hunt, Portsmouth, N. H.

Application August 1, 1945, Serial No. 608,340

14 Claims. (Cl. 153—21)

(Granted under the act of March 3, 1883, as amended April 30, 1928; 370 O. G. 757)

My invention relates to a Forming Machine. It has to do, more particularly, with a machine for finally shaping the corners of a pan which has been formed by previous shaping operations, although it is not necessarily limited thereto.

In producing square or rectangular pans from sheet metal according to the process which I employ, the ends and sides of the sheet are bent in a series of forming operations to form upstanding endwalls and sidewalls which are at a suitable angle relative to the bottom of the pan. In producing the corners at the junctions of adjacent walls, it is necessary to bend excess metal into overlapping layers or plaits by a series of forming operations. This sometimes distorts the corners, especially if the pan being produced is a deep pan.

The object of my invention is to provide a simple machine which is very effective for finally shaping and finishing the corners of a sheet metal square or rectangular pan which has been formed by previous bending operations.

The preferred embodiment of my invention is illustrated in the accompanying drawings wherein similar characters of reference designate corresponding parts and wherein:

Fig. 1 is a side elevational view of a machine constructed according to my invention.

Fig. 2 is a top plan view of my machine.

With reference to the drawings, I have illustrated my machine as comprising a table 1 which carries the various operating parts thereof. This table includes the top plate 2. Mounted on top of the plate 2 are a pair of vertically reciprocable forming units 3 and a pair of cooperative corner-embracing units 4, as shown in Figs. 1 and 2.

Figure 3:
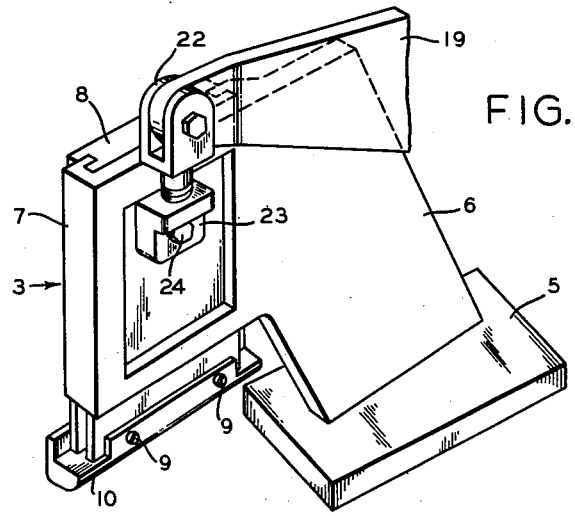
Fig. 3 is a perspective view of one of the vertically reciprocable shaping units.

Each of the units 3, as shown best in Fig. 3, comprises a base plate 5 which carries a vertical standard 6 that projects upwardly and forwardly. The lower end of standard 6 is disposed at an angle relative to the side edges of the plate 5 for a purpose which will be apparent hereinafter. The standard 6 has a vertically disposed guideway 7 formed on its forward portion. This guideway 7 has a slide 8 mounted therein for relative vertical movement. This slide 8 has removably attached to its lower edge, by means of screws 9, the interior corner shaping member or die 10.

Each of the plates 5 serves as a slide which is mounted in a transverse guideway 11 (Fig. 2) formed on the top of the plate 2 towards the rear of the table. The guideway 11 is formed by a single forward guide strip 12 and two rear guide strips 13 which have their inner ends spaced apart. As shown in Fig. 1, the strips 12 and 13 have flanges beneath which the plates 5 extend. By tightening the bolts 14, which secure the strips to the plate 2, the plates 5 may be clamped to the plate 2. Thus, the units 3 may be adjusted laterally on the table relative to each other and to the plate 2.

At the ends of the guideway 11 towards the rear side thereof, I provide the vertical standards 15, as shown in Figs. 1 and 2. Also, midway of the ends of the guideway, I provide the standards 16. All of the standards are suitably secured to the plate 2 and each has a bearing on its upper end which rotatably receives a transverse shaft 17. The shaft 17 has a slot or keyway 18 formed therein and extending its full length.

Each end portion of the shaft, between standards 15 and 16, carries a crank arm 19, as shown best in Fig. 2. This crank arm is provided with a collar 20 which surrounds the shaft and which carries a set screw 21 for cooperating with the slot 18. The arm 19 extends forwardly and its forward end (Fig. 3) is pivotally connected to the upper portion of a yoke 22. The yoke 22 has its lower end threaded into an angle bracket 23 which is pivotally connected by bolt 24 to the slide 8 of the adjacent unit 3. It will be apparent that when shaft 17 is rocked, the arms 19 will be rocked and, consequently, the slides 8 will be moved vertically.

The mechanism for rocking the shaft 17 includes a rocking lever 25 extending rearwardly therefrom, as shown in Figs. 1 and 2. This lever 25 has a collar 26 on its forward end which surrounds shaft 17 and is located therein between the standards 16 and which carries a set screw 27 for cooperation with slot 18. The arm 25 extends rearwardly beyond the rear edge of plate 2 and its rear end is pivotally connected, as at 28, to the upper end of a piston rod 29. The rod 29 extends upwardly from a fluid-actuated cylinder and piston unit 30. This unit 30 is pivotally connected, as at 31, to a rearwardly projecting support 32 extending from the lower part of the table. The unit 30 is controlled by a valve 33 disposed at the front side of the table. The valve 33 is connected by fluid lines 34 and 35 to the unit 30 and to a suitable source of fluid under pressure by a line 36. A stop 37 (Fig. 1) on the rear edge of plate 2 will limit downward swinging movement of the rear end of arm 25.

Each of the corner embracing units 4 comprises an embracing or supporting die 38 which is substantially L-shape in horizontal cross-section and the vertical surfaces of which will embrace one side and a portion of the bottom of the pan. If a pan having a different angular relationship of bottom and sidewall, is to be shaped by my machine, the dies 38 will be replaced with dies of corresponding shape. The dies 38 are secured to a raised part 2a (Figs. 1 and 2) at the forward side of the plate 2 by means of clamping strips 39 which are removably attached to the plate by bolt and slot connections 40. The ends of the strips 39 will engage horizontal flanges 41 formed on the dies 38. With this arrangement, the dies 38 may be adjusted laterally and forwardly and rearwardly on the plate 2.

Just behind each of the dies 38 at the shoulder 2b (Figs. 1 and 5), formed at the rear edge of raised part 2a of the plate 2, there is mounted a pan retaining bracket 42. Each bracket 42 is L-shape in vertical cross-section with the arms disposed in the same angular relationship as the walls of the pan. The inner surfaces of the bracket 42 are provided with channels 43 of proper size and shape to receive the bead on the upper edge of the walls of the pan. The bracket 42 is secured to the plate 2 for lateral adjustment by means of a bracket 44 which is mounted on the plate by a screw and slot mounting 45. The bracket 44 has a socket which adjustably receives a pin 46 that carries the bracket 42.

Figure 4:
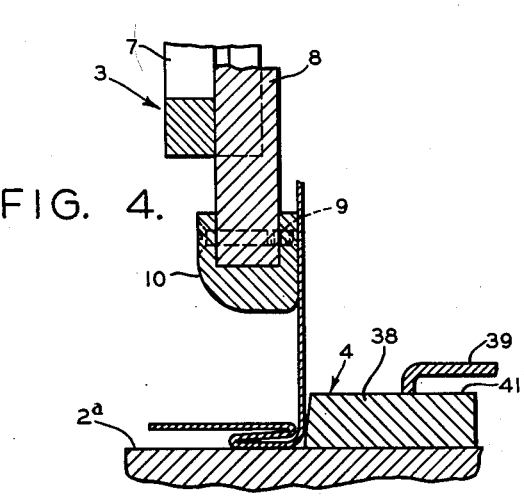
Fig. 4 is a vertical sectional view of the shaping unit, showing the pan in position to be formed thereby.
Figure 5:
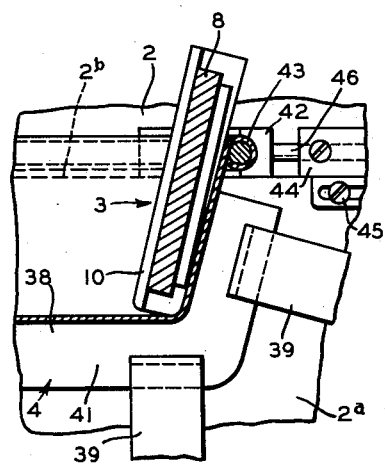
Fig. 5 is a horizontal sectional view of the shaping unit showing the pan in position to be formed thereby.
Figure 6:
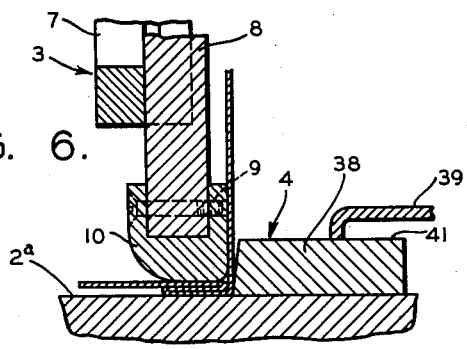
Fig. 6 is a view similar to Fig. 4 but showing the shaping unit finally forming the corner of the pan.

In using the machine, a pan is placed between the corner-embracing units 4 with its end wall resting on the part 2a of plate 2. The bottom of the pan will extend forwardly at an angle relative to plate 2, as shown by the dotted lines in Fig. 1, due to the fact that the sidewalls and endwalls of the pan extend from the bottom at an angle. The units 4 and the units 3 have previously been adjusted a suitable distance apart, depending upon the size of the pan being formed. The units 3 are disposed at the same angle relative to plates 5 as the angle of the sidewall of the pan relative to the bottom wall. These units may be replaced with other suitable units if the machine is to work on pans having their sidewalls at different angles. The dies 10 are of proper shape to impart the desired shape to the corners of the pan and the dies 38 are of complemental shape, as illustrated in Figs. 4 and 5. The corners of the pan will be loosely formed or distorted at this time as shown in Fig. 4. The unit 30 is now actuated to move dies 10 into cooperative relationship with dies 38, as shown in Fig. 5, to properly shape the corners. During this operation, the bead on the pan will be disposed in the channels 43 formed in brackets 42 and thus will aid retention of the pan in position during the forming operation. When one end of the pan is formed, it may be reversed and the other end formed.

It will be apparent from the above description that I have provided a simple machine which will finally shape and finish the corners of a square or rectangular pan which have been distorted during previous forming operations.

The invention described herein may be manufactured and used by or for the Government of the United States of America for government purposes without the payment of any royalty thereon or therefor.

What I claim is:

1. A forming machine for forming the corners of a sheet metal article having adjoining walls at an angle to each other comprising, in combination upon a structural frame, a pair of normally fixed shaping members for embracing the exterior of two of the corners at opposite ends of the same wall, and a pair of shaping members movable parallel to each other supported upon said structural frame for engaging the interiors of said two corners for cooperating with said exterior shaping members to properly shape the corners.

2. A forming machine for forming the corners of a sheet metal pan of rectangular form comprising a base plate, a pair of corner-embracing members carried by said base plate and between which one end of the pan is received, said members being adjustably mounted on the base plate to accommodate pans of varying size, and a pair of shaping members supported upon said base plate for cooperation with said corner embracing members for engaging the interiors of the corners, said shaping members being adjustably mounted to accommodate pans of varying size, and means for reciprocating said shaping members.

3. A structure according to claim 2 including locating brackets associated with said corner-embracing members and having channels for receiving the bead formed on the wall of the pan.

4. A structure according to claim 2 including means for adjustably mounting said corner-embracing members for adjustment both laterally, and forwardly and rearwardly on said base plate.

5. A structure according to claim 2 wherein said corner-embracing members are mounted for adjustment in two directions on the base plate, and said vertically reciprocable shaping members are mounted for adjustment laterally relative to each other and to the base plate.

6. A forming machine for finishing the corners of a sheet metal pan of rectangular form, said pan having upstanding endwalls and sidewalls angularly disposed with respect to the pan bottom and having excess metal in overlapping layers at the corners thereof, said machine comprising, in combination, a structural framework including a base plate, a pair of embracing members carried by said base plate and adapted to receive one end of said pan between two of the aforesaid corners thereof with said overlapping layers of excess metal in contact with said base plate, said embracing members being adjustably mounted upon said base plate to accommodate pans of varying size, a pair of shaping members supported upon said structural framework and above said base plate cooperating with said embracing members for engaging the interiors of the two corners between said embracing members, said shaping members being adjustable in position to accommodate pans of varying size and means for displacing said shaping members toward said base plate thereby forming said two corners between said embracing members.

7. Apparatus as in claim 6 wherein said embracing members are adjustable in two directions on said base plate, said shaping members being reciprocable and adjustable laterally relative to each other and to said base plate and parallel to said end of said pan between said embracing members.

8. A forming machine for forming the corners of a sheet metal article having adjoining walls at an angle to each other comprising, in combination upon a structural frame, a pair of normally fixed shaping members for embracing the exterior of two of the corners at opposite ends of the same wall, and a pair of shaping members supported upon said structural frame and movable perpendicularly to said wall for engaging the interiors of said two corners for cooperating with said exterior shaping members to properly shape the corners.

9. A forming machine for forming the corners of a sheet metal article having adjoining walls at an angle to each other comprising in combination upon a structural frame a normally fixed shaping element, a normally fixed positioning element, said shaping element and said positioning element being adapted to embrace the exterior of two of the corners at opposite ends of the same wall and a movable shaping member supported upon said structural frame and movable in a direction perpendicular to said wall engaging the interior of one of said corners for cooperating with said exterior shaping member to properly shape said corners.

10. A machine for finishing preformed corners of a sheet metal article having adjoining walls at an angle to each other comprising, in combination, upon a structural frame, a pair of normally fixed shaping members for embracing the exterior of two corners at opposite ends of the same wall, a pair of movable shaping members, means supporting said movable shaping members upon said frame, said supporting means limiting movement of said pair of movable shaping members to a direction perpendicular to said wall intermediate said two corners, and means for moving said movable shaping members into engagement with said fixed shaping members along said perpendicular direction to properly shape said corners.

11. A machine for finishing preformed corners of a sheet metal article having adjoining walls at an angle to each other comprising, in combination upon a structural frame, a normally fixed shaping element, a normally fixed positioning element, said shaping element and said positioning element being adapted to embrace the exterior of two corners at opposite ends of the same wall, a movable shaping member, means supporting said shaping member upon said frame, said supporting means limiting movement of said movable shaping member to a direction perpendicular to said wall intermediate said two corners, and means for moving said movable shaping member into engagement with said fixed shaping member along said perpendicular direction to properly shape one of said corners.

12. A machine for finishing a preformed corner of a sheet metal article having adjoining walls at an angle to each other, said machine comprising, in combination upon a structural frame, a normally fixed shaping element, a normally fixed positioning element, said shaping element and said positioning element being adapted to embrace opposite ends of a wall adjacent said corner, a movable shaping member, means supporting said movable shaping member upon said frame, said supporting means limiting movement of said movable shaping member to a direction perpendicular to a wall adjacent said corner and means for moving said movable shaping member into engagement with said fixed shaping member along said perpendicular direction to properly shape said corner.

13. A machine for finishing preformed corners of a sheet metal article having adjoining walls at an angle to each other comprising, in combination upon a structural frame, a pair of normally fixed shaping members for embracing the exterior of two corners at opposite ends of the same wall, a pair of movable shaping members, means mechanically connected to said frame and operable to move said movable shaping members into engagement with said fixed shaping members to properly shape said corners, the movement of said movable shaping members being in a direction perpendicular to said wall intermediate said two corners.

14. A machine for finishing preformed corners of a sheet metal article having adjoining walls at an angle to each other, comprising in combination upon a structural frame, a normally fixed shaping element, a normally fixed positioning element, said shaping element and said positioning element being adapted to embrace the exterior of two corners at opposite ends of the same wall, a movable shaping member, means mechanically connected with said frame and operable to move said movable shaping member into engagement with said fixed shaping member to properly shape one of said corners, the movement of said movable shaping members being in a direction perpendicular to said wall intermediate said two corners.

EVERETT M. HUNT.

REFERENCES CITED

The following references are of record in the file of this patent:

UNITED STATES PATENTS

| Number | Name | Date |
| --- | --- | --- |
| 164,520 | Chalmers | June 15, 1875 |
| 172,640 | Martyn | Jan. 25, 1876 |
| 174,693 | Martyn | Mar. 14, 1876 |
| 269,811 | Orcutt et al. | Dec. 26, 1882 |
| 1,020,939 | Wittebolle | Mar. 19, 1912 |